2 Sheets—Sheet 1.

H. H. DUNLEVY.
Machine for Crozing and Chamfering Staves.
No. 212,448. Patented Feb. 18, 1879.

WITNESSES.                                INVENTOR.

2 Sheets—Sheet 2.

H. H. DUNLEVY.
Machine for Crozing and Chamfering Staves.
No. 212,448. Patented Feb. 18, 1879.

WITNESSES.
F. W. Cushing
E. B. Howard.

INVENTOR.
Harrison H. Dunlevy
By Howard Bros
Atty's.

UNITED STATES PATENT OFFICE.

HARRISON H. DUNLEVY, OF WHEELING, WEST VIRGINIA, ASSIGNOR OF ONE-HALF HIS RIGHT TO WILLIAM A. WILSON, OF SAME PLACE.

IMPROVEMENT IN MACHINES FOR CROZING AND CHAMFERING STAVES.

Specification forming part of Letters Patent No. 212,448, dated February 18, 1879; application filed November 19, 1878.

*To all whom it may concern:*

Be it known that I, HARRISON H. DUNLEVY, of Wheeling, in the county of Ohio and State of West Virginia, have invented certain new and useful Improvements in Machines for Crozing and Chamfering Staves; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a machine in which the stave-cylinder is placed after being set up, for the purpose of forming the croze and chine at the end of the staves for the receival of the heading.

The invention consists, first, of two stationary clamping-rings attached to the ends of movable carriages, sliding on suitable ways, which encircle the cylinder of staves at the ends and secures it firmly in position while being dressed.

The invention consists, secondly, of two radially-expansible cutter-heads mounted on movable carriages and certain mechanical means of operating the same, whereby the cutting-tools are radially expanded to the required diameter to cut the proper depth of croze and sever the ends of the staves at one operation.

The invention consists, thirdly, of an adjustable barrel-rest, by means of which the barrel is always kept on a center line with the clamping-rings, all of which will be hereinafter fully explained in detail.

Figure 1:
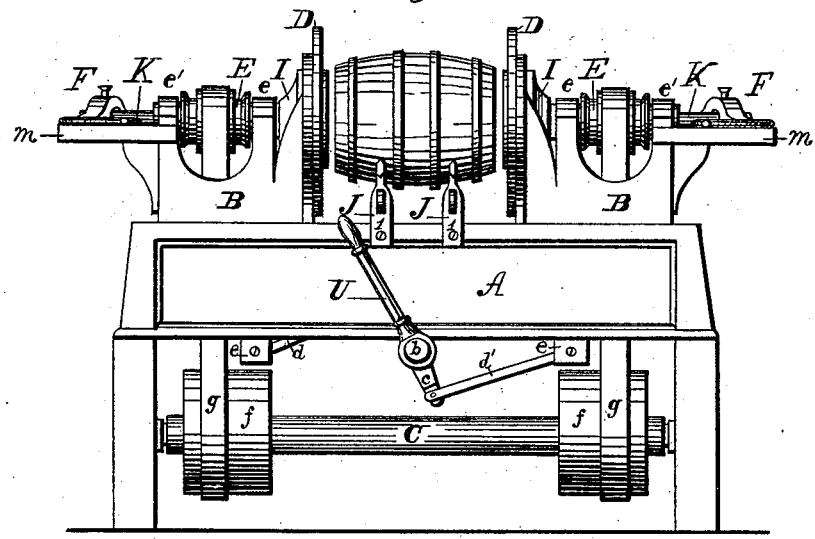
Figure 2:
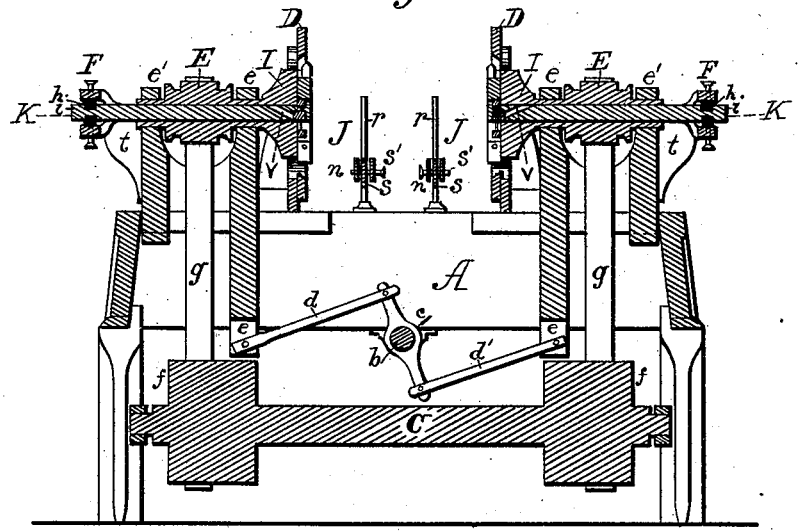
Figures 3, 4:
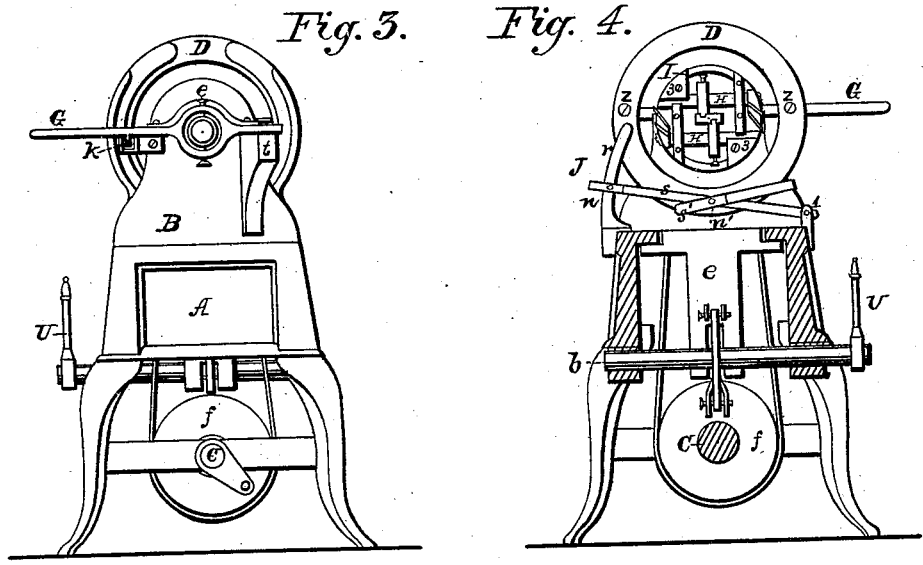
Figure 5:
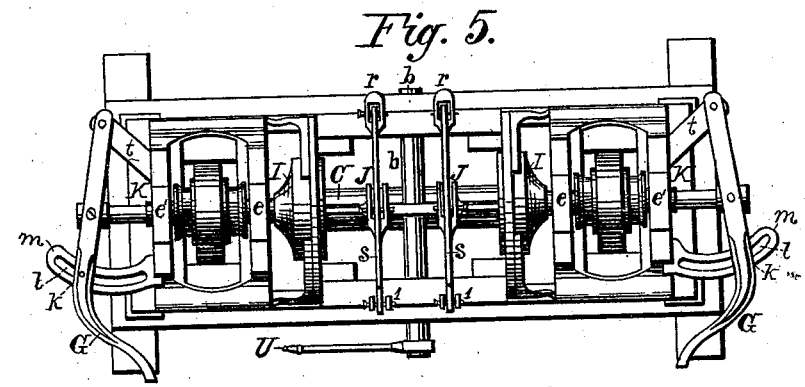
Figures 6, 7, 8:
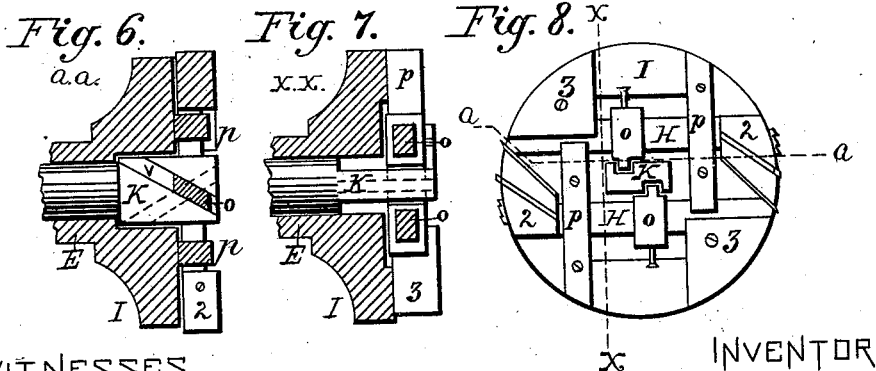

In the drawings, Figure 1 is a side elevation. Fig. 2 is a central longitudinal section. Fig. 3 is an end view. Fig. 4 is a central cross-section; Fig. 5, a plan or top view; Figs. 6, 7, and 8, enlarged views of cutter-head.

Like letters of reference refer to like parts.

The letter A designates the main frame of the machine. B B are movable carriages, conveying clamping-rings and cutting mechanism, and constructed to slide lengthwise on ways on the frame A.

The carriages are operated by means of the hand-lever U, shaft $b$, cross-arm $c$, links $d\ d'$, connected to the standards $e\ e$ of the carriages.

C is a power-shaft. $f f$ are pulleys. $g\ g$ are belts. D D are removable clamping-rings secured to the ends of the carriages B B by means of the screws $z\ z$, Fig. 4.

The rings D D have a beveled edge or flaring circular aperture, to facilitate the entrance of the end of the stave-cylinder. As the mechanism of both carriages is alike, reference will only be made to one of them. $e\ e'$ are standards for the support of the tool-shaft. E is a hollow shaft journaled on the standards $e\ e'$. I is a head-plate, upon which the cutting-tools are secured. The head is permanently attached to the end of the hollow shaft E, and forms a part thereof, as shown in Fig. 6.

K is a slide-rod or axle, which works through the center of the hollow shaft and revolves with the same. The end which passes through the tool-head is squared a short distance back and provided with inclined grooves V V on opposite sides, of suitable inclination to advance the cutting-tools by means of studs O O, Figs. 6, 7, and 8, secured to the tool-arms, which engage and work in them. The other end of this rod is provided with a loose collar, $h$, Fig. 2, placed between two stationary collars, $i\ i$, and is pivoted to bearings in circular rings on the lever G. The lever G is pivoted to a projection, $t$, Fig. 5, on the standard $e'$, and has a stud, $k$, which works in a curved guide-rest, M, secured to the standard $e'$.

On the head-plate I are secured the cutting-tools. (See Figs. 6, 7, and 8.) H is a sliding tool-arm, to which are attached at 2 2 the cutting-tools for chamfering, crozing, and squaring the staves, and provided at 3 3 with weight-blocks to balance the working strain of the tools. The studs O O are adjustable on the slide-bar H, to regulate the diameter and depth of croze. $p\ p$ are slotted pieces through which the tool-arm works, one end being shouldered to overlap the weighted end of the opposite tool-arm.

J J are V-shaped adjustable barrel-rests. S S are inclined bars, hinged at 1 1 to the frame of the machine, and adjustably connected to the curved uprights $r\ r$ with set-screws $n$. S' S' are reversed inclined pieces, slotted at one end, to permit being slipped over the bars S S, and moved up or down as desired, they being fastened thus together with set-screws $n'$. A barrel-rest is thus formed of any desired height and adapted to any sized barrel.

The mode of operation is as follows: Motion being imparted to the cutting mechanism, the cylinder of staves to be dressed is placed on the barrel-rests J J, which are adjusted to center the barrel ends on a line with the axis of the tool-head. The carriages B B are then advanced toward each other by means of the lever U until the clamping-rings encircle the end of the stave-cylinder and secure it firmly in position. The cutting-tools are then expanded sufficiently to cut off the end of the staves and form the croze by means of the hand-levers G G, which are drawn toward the center of the machine. By a reverse movement of the levers G G and U the cutting-tools are withdrawn and the clamping-rings moved away from the stave-cylinder, which permits it being removed and another substituted.

I do not wish to confine myself strictly to the mode of adjusting the cutters herein shown, as the bits on the tool-head can be adjusted in or out to the required diameter by means of a toggle-strap connection around the tool-shaft, and pivoted to a loose collar or sleeve and operated by a lever; but I prefer the mode herein shown, as far as I have experimented, as being more satisfactory in the adjustment of the tools.

The advantages of radially-expansible cutting-tools, removable clamping-rings, and adjustable barrel-rests in a machine of this class are obvious, and need not specially be referred to.

Having described my invention, what I claim, and desire to secure by Letters Patent, is—

1. A barrel crozing and chamfering machine consisting of one or more radially-expansible revolving cutting-tools, to form the croze and chine, stationary clamping-rings to hold the stave-cylinder, mounted on carriages constructed to slide on the bed of the machine, in combination with an adjustable V-shaped barrel-rest adapted to center the barrel between the clamping-rings, and suitable mechanism to operate the several parts, substantially as herein shown, and for the purposes set forth.

2. The combination of the carriages B B, containing the cutting mechanism, removable clamping-rings D D, frame A, shaft $b$, hand-lever U, cross-arm C, links $d\ d$, standards $e\ e$, substantially as herein shown, and for the purposes set forth.

3. The hollow shaft E, supports $e\ e$, tool-head I, constructed with tool-arms H H, provided with suitable cutting-bits 2 2 and weights 3 3, strap pieces $p\ p$, adjustable stud O of the slide-rod K, having inclined grooves V V, collars $i\ i$, loose collars $h$, bearings $e\ e$, hand-lever G, pin $k$, curved guide-rest M, frame A, belt $g$, pulley $f$, and shaft C, substantially as herein shown, and for the purposes set forth.

4. The combination, with the frame A, of the barrel-rests J J, consisting of the hinged pieces S S, sliding pieces S' S', curved uprights $r\ r$, and suitable fastenings $n\ n'$, substantially as herein shown, and for the purposes set forth.

In testimony that I claim the foregoing as my own I hereby affix my signature in presence of two witnesses.

HARRISON H. DUNLEVY.

Witnesses:
E. B. HOWARD,
JAMES JONES.